(12) United States Patent
Francisco

(10) Patent No.: US 9,854,284 B2
(45) Date of Patent: *Dec. 26, 2017

(54) SYNCHRONIZING PROGRAM PRESENTATION

(71) Applicant: Comcast Cable Communications, LLC, Philadelphia, PA (US)

(72) Inventor: Mark David Francisco, Clarksburg, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,418

(22) Filed: Nov. 23, 2015

(65) Prior Publication Data

US 2016/0182928 A1 Jun. 23, 2016

Related U.S. Application Data

(63) Continuation of application No. 13/610,220, filed on Sep. 11, 2012, now Pat. No. 9,226,011.

(51) Int. Cl.
*H04N 21/242* (2011.01)
*H04N 21/234* (2011.01)
(Continued)

(52) U.S. Cl.
CPC ......... *H04N 21/242* (2013.01); *H04N 21/233* (2013.01); *H04N 21/23418* (2013.01);
(Continued)

(58) Field of Classification Search
CPC ............ H04N 21/242; H04N 21/2625; H04N 21/23418; H04N 21/233; H04N 21/8545;
(Continued)

(56) References Cited

U.S. PATENT DOCUMENTS 7,664,057 B1 2/2010 Wu et al.
9,226,011 B2 * 12/2015 Francisco ............ H04N 21/242
(Continued)

FOREIGN PATENT DOCUMENTS

EP 1773072 A1 4/2007
WO 2008/084947 A1 7/2008
(Continued)

OTHER PUBLICATIONS

Albracht, Chris, "Xbox Rolls Out Netflix Party (No Other Game Consoles Allowed," Online Video News, Aug. 11, 2009, pp. 1-14; pulled from http://gigaom.com/videdxbox-rolls-out-netflix-party-no-other-game-consoles-allowed on Aug. 16, 2012.
(Continued)

*Primary Examiner* — Benjamin R Bruckart
*Assistant Examiner* — Akshay Doshi
(74) *Attorney, Agent, or Firm* — Banner & Witcoff, Ltd.

(57) ABSTRACT

Systems and methods that may facilitate synchronizing the presentation of a program on multiple devices are disclosed. Synchronization information related to a program may be exchanged via a two-way communications channel. Amounts by which each device may delay its presentation of a program may be calculated and/or exchanged.

19 Claims, 13 Drawing Sheets

(51) Int. Cl.
| | |
|---|---|
| H04N 21/233 | (2011.01) |
| H04N 21/6587 | (2011.01) |
| H04N 21/43 | (2011.01) |
| H04H 20/18 | (2008.01) |
| H04N 21/262 | (2011.01) |
| H04N 21/8545 | (2011.01) |
| H04N 21/4788 | (2011.01) |
| H04N 21/4722 | (2011.01) |
| H04N 21/462 | (2011.01) |
| H04N 21/8547 | (2011.01) |
| G06F 15/16 | (2006.01) |

(52) U.S. Cl.
CPC ..... *H04N 21/2625* (2013.01); *H04N 21/4302* (2013.01); *H04N 21/4305* (2013.01); *H04N 21/4307* (2013.01); *H04N 21/4622* (2013.01); *H04N 21/4722* (2013.01); *H04N 21/4788* (2013.01); *H04N 21/6587* (2013.01); *H04N 21/8545* (2013.01); *H04N 21/8547* (2013.01); *G06F 15/16* (2013.01); *H04H 20/18* (2013.01)

(58) Field of Classification Search
CPC ........... H04N 21/4788; H04N 21/6587; H04N 21/4305; H04N 21/4307; H04N 21/8547; H04N 21/4302; H04N 21/4722; H04N 21/4622; G06F 15/16; H04H 20/18
See application file for complete search history.

(56) References Cited

U.S. PATENT DOCUMENTS

| | | |
|---|---|---|
| 2006/0156374 A1 | 7/2006 | Hu et al. |
| 2007/0274537 A1 | 11/2007 | Srinivasan |
| 2008/0075428 A1 | 3/2008 | Hashimoto |
| 2008/0117937 A1 | 5/2008 | Firestone et al. |
| 2008/0209482 A1 | 8/2008 | Meek et al. |
| 2009/0019503 A1* | 1/2009 | Vorbau .............. G06F 17/30873 725/109 |
| 2009/0089824 A1* | 4/2009 | Beyabani .............. H04H 60/80 725/17 |
| 2009/0167942 A1 | 7/2009 | Hoogenstraaten et al. |
| 2010/0104259 A1* | 4/2010 | Shakya .................. H04N 5/913 386/252 |
| 2011/0128445 A1* | 6/2011 | Carrieres ............... H04N 17/00 348/512 |
| 2012/0177067 A1 | 7/2012 | Cho et al. |
| 2012/0278823 A1* | 11/2012 | Rogers .................. H04N 7/162 725/5 |
| 2012/0284419 A1 | 11/2012 | Brenes |
| 2013/0173742 A1* | 7/2013 | Thomas .............. H04L 65/4076 709/217 |
| 2013/0198298 A1 | 8/2013 | Li et al. |
| 2013/0278826 A1* | 10/2013 | Schlieski ................. H04N 5/04 348/515 |
| 2014/0095662 A1 | 4/2014 | Klos et al. |

FOREIGN PATENT DOCUMENTS

| | | |
|---|---|---|
| WO | 2009/020302 A2 | 2/2009 |
| WO | 2010106075 A1 | 9/2010 |

OTHER PUBLICATIONS

"How to Calibrate Lag in Guitar Hero," pulled from http://www.dummies.com/how-to/content/how-to-calibrate-lag-in-guitar-hero.html on Aug. 16, 2012.

Donohue, Steve, "Audible Magic to Launch Live TV Synchronization Service," pulled from http://www.itvt.com/story/8632/audible-magic-launch-live-tv-synchronization-service on Aug. 16, 2012.

"Guitar Hero," pp. 1-33, pulled from http://en.wikipedia.org/wiki/Guitar_Hero on Aug. 16, 2012.

Extended European Search Report—EP 13183907.8—dated Oct. 20, 2014.

Response to European Extended Search Report—EP 13183907.8—dated May 19, 2015.

* cited by examiner

Device 1:

Device 2:

Device 1:

Device 2:

SYNCHRONIZING PROGRAM PRESENTATION

CROSS-REFERENCE TO RELATED APPLICATIONS

This application is a continuation of and claims priority to U.S. patent application Ser. No. 13/610,220, which was filed on Sep. 11, 2012 and entitled "Synchronizing Program Presentation," and which is hereby incorporated by reference herein in its entirety.

BACKGROUND

If two friends are remote from one another, but watching the same television show, they may engage in an online chat or a voice conversation, and may wish to discuss the events of the show while they watch. Unfortunately, video distribution systems, such as "over the air" television or cable television, may not distribute a programming feed to all receivers in perfect synchronization. The programming feed delivered to some devices may be delayed by a greater amount of time than the feed delivered to other devices for a variety of reasons. For example, a programming feed of the Super Bowl football game in New Orleans, La., may be delivered to user A in Baton Rouge, and to user B in London, England. The difference in geographic (and network) distance may result in user A seeing events before user B sees the event. User A and user B may also receive the programming at different times, due to, for example, differing delays caused by local advertising insertion systems, differing distribution network delays, and possibly different times of initial transmission. Differences in reception times may cause undesirable side effects in the users' conversation. User A may react to a scene that user B has not yet received, and user A's reaction on the phone or in the chat may wind up spoiling the viewing experience for user B. Accordingly, there is a need to offer better synchronization and a better shared experience for users.

SUMMARY

Some aspects of the disclosure relate to methods and systems that may facilitate synchronizing presentation of content on multiple different devices. According to one aspect of the disclosure, a presentation may be sent to a device via a distribution network.

According to another aspect of the disclosure, synchronization information may be exchanged over a two-way communications channel that is independent of the channel used to transmit the content. The synchronization information may comprise, for example, a portion of a program, a fingerprint of a program or a portion thereof, an indication of when certain portions of a program were received, an indication of an amount by which to delay output of a program, or a variety of other types of information.

According to a further aspect of the disclosure, a device may configure itself to delay its output of a program based on information contained within a program.

According to yet another aspect of the disclosure, a device may buffer or otherwise delay output of programming content in order to synchronize its output of the programming content with the output of another device.

According to a still further aspect of the disclosure, the length of time by which a device may delay its output of programming content may be calculated using synchronization information.

According to an additional aspect of the disclosure, a two-way communications channel may be used to facilitate joint consumption of content, or other experiences, of a program that is synchronized across devices. Examples of joint consumption of content include text, audio and/or video chats and sharing visual markups, such as a user drawing on a screen or presenting a document, such as a website, while the joint viewers are viewing (or otherwise consuming) a particular item of content, such as video content.

The preceding presents a simplified summary in order to provide a basic understanding of some aspects of the disclosure. The summary is not an extensive overview of the disclosure. It is intended neither to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and is not limited in the accompanying figures.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
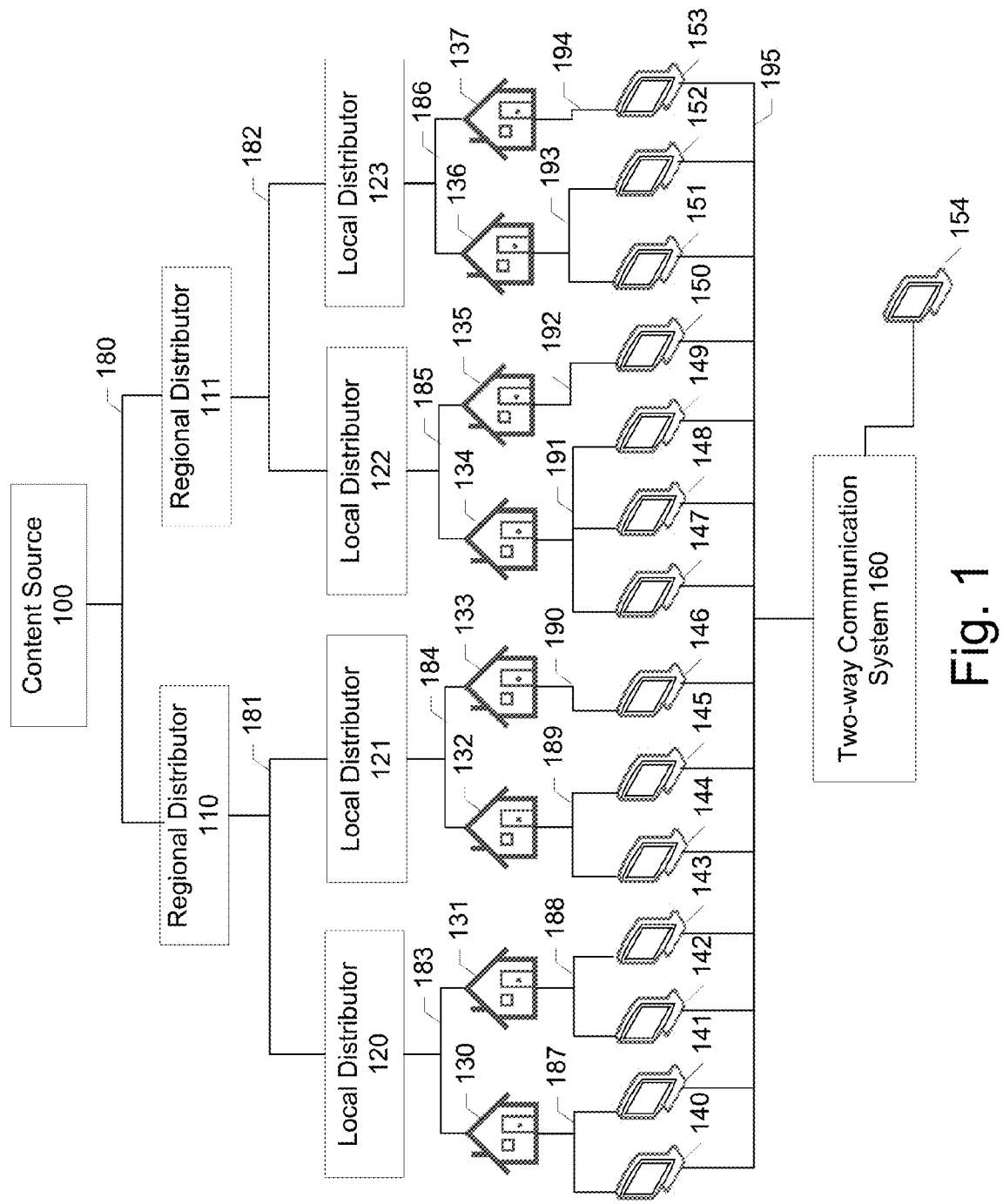
FIG. 1 illustrates an example of a communications network architecture.

FIG. 1 illustrates an example of a network architecture. In this example one or more items of content, such as programs, from content source 100 may be distributed over one or more distribution networks to devices 140-153 in premises 130-137, such as homes, businesses, institutions, etc. A program may be, for example, an audio presentation, such as a radio broadcast; a video presentation, such as a slide show; or an audio and video presentation, such as a television show, movie, video game, or other content. In this example, a program is transmitted over links 180 to regional distributors 110 and 111. The program is then transmitted to local distributors 120 and 121 over links 181 and to local distributors 122 and 123 over links 182. Finally, the local distributors may distribute the program to premises 130-137 over links 183-186. In each premises, or around the premises if extended by, e.g. a wireless network, one or more devices (140-153) may be connected by links 187-194. Examples of links 180-195 may include fiber optic cabling, coaxial cabling, Ethernet cabling, telephone lines, satellite transmissions, cellular transmissions, "over the air" television transmissions, and any other type of wired or wireless link.

A program distributed from content source 100 may arrive at different devices at different times. The devices may be associated with the same premise or the devices may be associated with different premises. For example, device 141 may receive a portion of a program a few seconds before the same portion is received at device 147. This difference may occur, for example, due to delays at any point in the distribution process. For example, the time required to transmit the program across any of links 180-194 may differ. Differing delays may be introduced by regional distributors 110 and 111, local distributors 120-123, the equipment in premises 130-137, or other factors.

Devices 140-153 may be connected, wired or wirelessly, to two-way communication system 160 via two-way links 195. Links 195 may allow data to be sent from and received by a device. Examples of two-way links include telephone lines, coaxial cable, optical fiber, hybrid optical fiber/coax, and wireless links (cellular, satellite, etc.). Examples of devices that may form part of two-way communication system 160 include cable modems, optical termination units, network gateways, wireless routers, set-top-boxes, etc. that can serve to facilitate communications between devices. Two-way communications enable a variety of communication options, such as, for example, a multi-user chat. Links 180-194 may be one-way or two-way links.

Users of devices 140-153 may wish to share the experience of consuming a program. For example, the users of devices 141, 147, and 153 may wish to watch a football game while voice chatting with one another, or otherwise collaborate while consuming the program. That the program may reach devices 141, 147, or 153 at different times may impede this experience. For example, one user may comment on a play before another user sees the play. Similarly, if the program is a comedy, one user may laugh at or repeat a joke before another user hears the joke.

Problems associated with a program reaching different devices at different times may be minimized or eliminated by synchronizing each device's output of the program. Thus, each user will experience identical portions of the program at the same time.

Synchronization may be achieved by delaying output of the program at the devices that receive the program before other devices. The delay may be implemented so that the devices that receive the program before other devices may delay output of the program until the other devices receive the program. Alternatively, all of the devices associated with a collaborative experience of a program, including the device that received a portion of the program last, may delay output of the program. This may be preferred, for example, because it allows for smooth presentation of the program on all devices, even if delivery of the program to a device becomes more delayed than when the synchronization began due to, for example, network jitter. Various methods for synchronizing a program across devices are explained in more detail below with reference to FIGS. 2-5. At least some of these methods may be applied to any item of content, including programs that were not designed to facilitate synchronization or collaborative experiences.

The communications architecture of FIG. 1 is an example. A greater or fewer number of program sources, distributors, premises, devices, and two-way communication systems may exist. For example, a program may pass through a greater or fewer number of distributors before reaching a device. The use of homes to symbolize premises 130-137 is merely exemplary. A program may be transmitted to offices or other structures or locations, such as nodes, radio frequency communications devices, such as cellular towers, etc. Further, users connected to varying distribution networks may experience a program collaboratively in some embodiments. For example, device 154 of FIG. 1 may be connected to a distribution network (not shown) that is separate from the distribution networks shown in FIG. 1. Device 154 may synchronize its presentation of a program with the presentation from another device by, for example, communicating synchronization information over the two-way communication system 160.

Examples of devices 140-154 include any user devices, such as televisions, audio systems, personal computers, tablet computers, mobile smart phones, and any other device that may present a video and/or audio stream to a user. Further examples of devices 140-154 include devices that output a video and/or audio stream to a device that may present the stream to a user. For example, the functionality of devices 140-154 may be embodied in a dedicated device, a digital video recorder, a "set-top-box," etc.

In addition to a voice chat, further examples of how a program may be collaboratively experienced include video chatting while the program is presented, exchanging text or graphics while the program is presented (for example, a text chat, allowing users to mark areas of a screen with, for example, a virtual marker, or allowing users to present graphics, documents, or websites), and sharing control over inputs to an interactive program (such as an interactive television program or a video game). Users may also allow other users or collaborators to control presentation of the program. For example, devices 141, 147, and 153 in the previous example may allow one user's decision to pause the program to cause the program to be paused for all three users.

Methods for synchronizing a program will be explained below with reference to FIGS. 2-5. Then, methods for initiating and maintaining program synchronization during a collaborative experience of a program will be discussed with respect to FIG. 6.

Figure 2A:
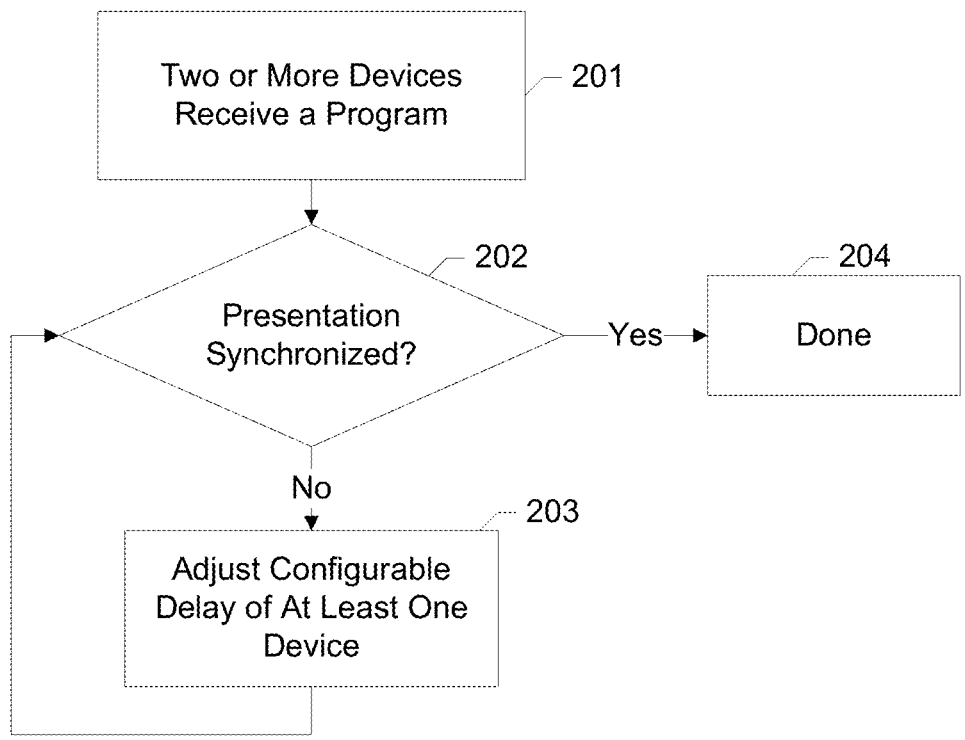
FIG. 2a illustrates a method of synchronizing a program across devices by adjusting a configurable delay.
Figure 2B:
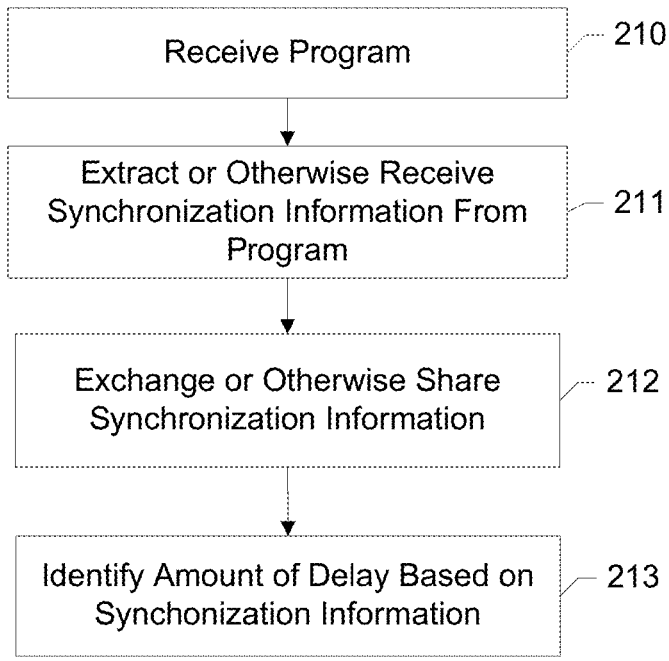
FIG. 2b illustrates a method of synchronizing a program across devices by sharing synchronization information between the devices.
Figure 2C:
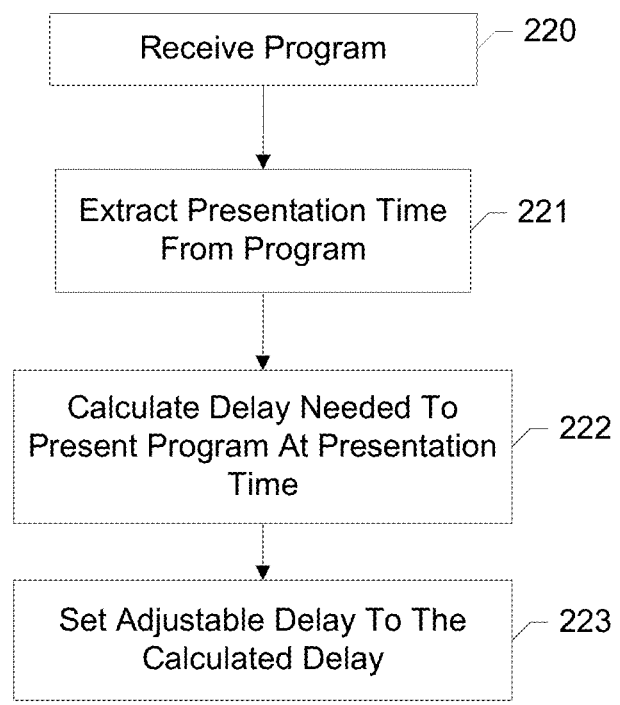
FIG. 2c illustrates a method by which a device may adjust its delay based on a received program.

FIGS. 2a-2c illustrate three methods for synchronizing a program across devices. Any one (or more) of these methods, alone or in combination, may be used. FIG. 2a illustrates a method of synchronizing a program across devices by adjusting a configurable delay. In step 201, two or more devices begin or continue receiving a program. Each device may delay the program by a configurable amount of time prior to outputting or presenting the program, so that the outputting is synchronized with the presentation by the other device(s). The configurable delay may be zero or near zero for the device that receives a program last. If the configurable amounts of time are currently sufficient to synchronize the presentation of the program, as determined in step 202, then nothing more is done (step 204). However, if the presentation is not synchronized, then the configurable delay on one or both of the devices may be adjusted (step 203) until the presentation is synchronized. The configurable delay may be adjusted incrementally, randomly, or otherwise, until synchronization is achieved. Synchronization may be achieved without using a two-way communications system that is connected to the devices. For example, two users may synchronize the output of their devices using the method of FIG. 2*a* while communicating with one another, e.g., over a telephone or another communication medium that is not connected to the devices being synchronized. In this example, a device may determine if the presentation of the program is synchronized (step 202) by prompting a user to indicate whether the presentation is currently synchronized. A device may also determine if the presentation is synchronized by examining timing information, fingerprints, or other information received from another device, as described in more detail below. Alternatively, the devices may communicate with one another over two-way communications system 160 to exchange synchronization data. These steps are described in greater detail below.

If the devices share a connection with one another, they may share information that helps to determine if the presentation of the program is synchronized on both devices. For example, the audio output associated with the program for one device may be transmitted to the other via the two-way communications system 160. This allows the audio output associated with the program from both devices to be compared. The comparison may be performed by a user, such as an installation technician or a consumer, or a computing device may perform the comparison and adjust the configurable delay automatically. Transmitting the audio of the program via the two-way communications system 160 may be performed to facilitate calibration of a device's adjustable delay, but might not performed in other situations, such as a normal collaborative presentation of a program, e.g. in a social setting. In other embodiments, video or other aspect(s) of a program, e.g., metadata, may be transmitted over the two-way communication system instead of, or in addition to, audio to determine synchronization and/or configurable delay.

When a device is added to a distribution network, the method of FIG. 2*a* may be used to synchronize the newly-added device with a reference device or an already-calibrated device. If this is done, then, after the calibration described with reference to FIG. 2*a* is completed, each device on the network will be in sync with each other device on the network. A reference device may be preconfigured with a large enough delay that the longest propagation delay for the distribution network does not exceed the preconfigured delay. This may guarantee that the program will be received by a device before the time it needs to be output to synchronize with the reference device. Synchronization may be facilitated by providing an application or utility designed to simplify determining if synchronization has been achieved, such as a repeating pattern of tones. However, any program may be used to synchronize two or more devices.

FIG. 2*b* illustrates a method of synchronizing a program across devices by sharing synchronization information between the devices. In step 210, the program is received. In step 211, synchronization information is extracted from the received program or otherwise received. In step 212, synchronization information is exchanged or otherwise shared. In step 213, the synchronization information is used to identify the amount by which to delay the program so that its output (e.g. its presentation at a device or its display) will be synchronized. A device may perform the identification of step 213 by performing a calculation based on synchronization information. Alternatively, the calculation may be performed at another location, such as another device or a server, and the device may perform the identification of step 213 by parsing a message that indicates the amount of delay. Examples of specific types of synchronization information and methods for identifying amounts of delay based on the synchronization information are discussed below with reference to FIGS. 3*a-c*, 4*a-d*, and 5.

The synchronization information exchanged in step 212 may take many forms, depending, for example, on where the calculation of the delays takes place. In some systems, each device may calculate the amount of delay required independently. In other systems, only one of the synchronized devices may calculate the delays. In still other systems, the delays may be calculated by a computing device (e.g., a server or other system) besides the devices being synchronized. The methods for calculating delay discussed below with reference to FIGS. 3*a-c*, 4*a-d*, and 5 may be used regardless of where the calculation takes place.

A device may receive synchronization information related to when other devices received the program. For example, the device may receive information that indicates what point in the program is currently being presented on one or more other devices. The device may use this information to calculate the amount by which to delay its own output of the program. The device may also send synchronization information that indicates the amount by which other devices should delay the program. Alternatively, or in addition, the device may send synchronization information related to when it received the program, thereby facilitating calculation of delay amounts by other devices. A device that does not calculate the amount by which to delay the program may transmit synchronization information related to when it received the program and then receive synchronization information containing indications of the amount by which it should delay the program. The synchronization information sent and/or received in step 212 may be communicated over a two-way communication channel, such as two-way communication system 160 of FIG. 1.

FIG. 2*c* illustrates a method by which a device may adjust its delay based solely or in part on the received program and/or information associated therewith. This method may be used to synchronize a device with the other devices on a distribution network without the aid of any of the other devices on the network. In step 220, the device receives a program. The program may indicate the time at which a certain portion of the program is to be output (e.g. presented) from a device. This presentation time is extracted in step 221. The device may then calculate the time difference between the current time and when the portion of the program is to be output (step 222), and sets its adjustable delay to the calculated time (step 223).

The indication of when a certain portion of the program is to be output from the device may come in a variety of formats. For example, the time when a portion of the program is to be output may be part of the visual or audio information of the program, such as, for example, audio cue tones. Alternatively, this time may be included in a data stream that carries the program. For example, a presentation time may be placed as user data in an MPEG-2 transport stream, as timed text tracks in MP4 streaming formats, or in any other suitable location. A presentation time may be in a format that indicates a show's title, season number, episode number, and/or a time offset from any fixed reference point (e.g., the start of the episode or the start of the series). A variety of other formats may also be used.

Times or markers when a portion of a program is to be output or presented from a device may be inserted periodically throughout a program, such as, for example, every ten seconds or at the beginning of various independently-coded pictures, such as i-frames. Calculating the delay needed to output the portion of the program at the indicated time (step 222) requires that the device have an accurate clock. This may be achieved by connecting to a time server using, for example, network time protocol, receiving GPS timing information (either from a GPS sensor or from another source, such as data from a distribution network or from two-way communication system 160), or a variety of other methods.

Each device that adjusts its output delay in one of the manners described above synchronizes its output with each other device that also adjusted its output delay in a different but compatible manner or an identical manner. Thus, the above-described methods may be used to synchronize many devices with one another without requiring communication between some or all of the devices. For example, device 140 may synchronize with device 141, and device 141 may synchronize with device 142. As a result, devices 140 and 142 are synchronized despite not having communicated any information between one another. Assuming the delay between a program source and a device does not change, the synchronization may be maintained indefinitely. Alternatively, synchronization may be established periodically, such as at random intervals, after network changes, or each time a program is collaboratively experienced.

Figure 3A:
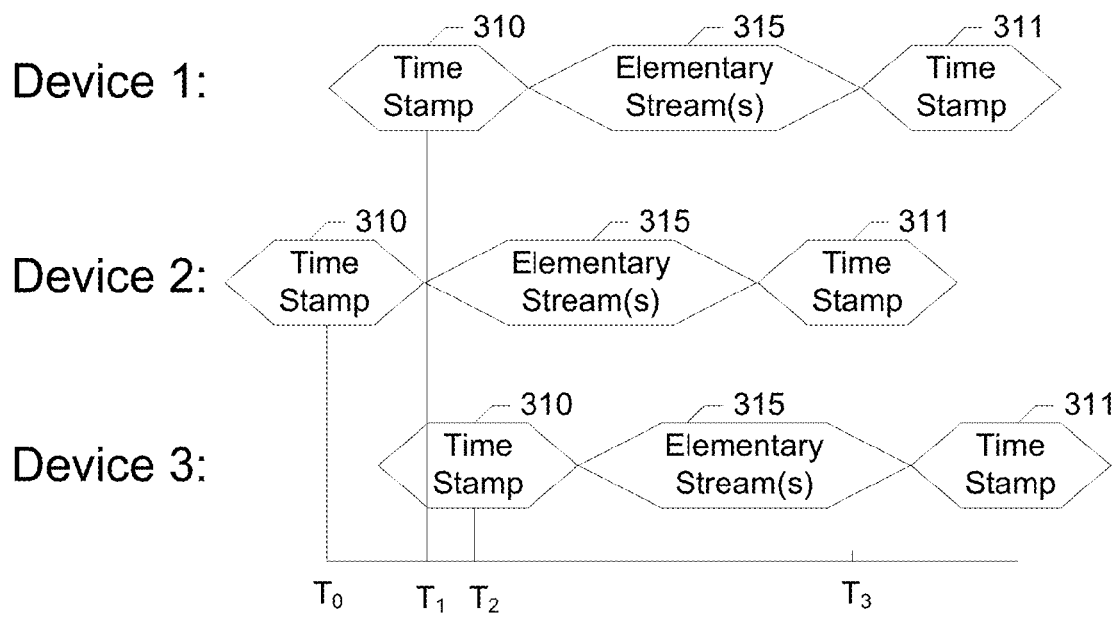
FIG. 3a illustrates example timing according to which a program may be received at several devices.

FIG. 3a illustrates an example of timing according to which a program may be received at three devices. The program may include, for example, time stamp 310 and time stamp 311. As shown in FIG. 3a, time stamp 310 and time stamp 311 are distributed along elementary stream(s) 315. Elementary streams 315 may be, for example, audio and/or video streams. Time stamps 310 and 311 may indicate the time within the program. For example, time stamp 310 may indicate that 4 seconds of the program have passed, and time stamp 311 may indicate that 6 seconds of the program have passed. Examples of known time stamps formats include program clock references (PCR), presentation time stamps (PTS), decode time stamps (DTS), etc.

As shown in FIG. 3a, device 2 receives time stamp 310 first at time $T_0$. Device 1 receives time stamp 310 second at time $T_1$, and device 3 receives time stamp 310 third at time $T_2$. As illustrated, these three devices receive the program at slightly different times. For example, time $T_0$ may occur a few seconds before time $T_2$.

Figure 3B:
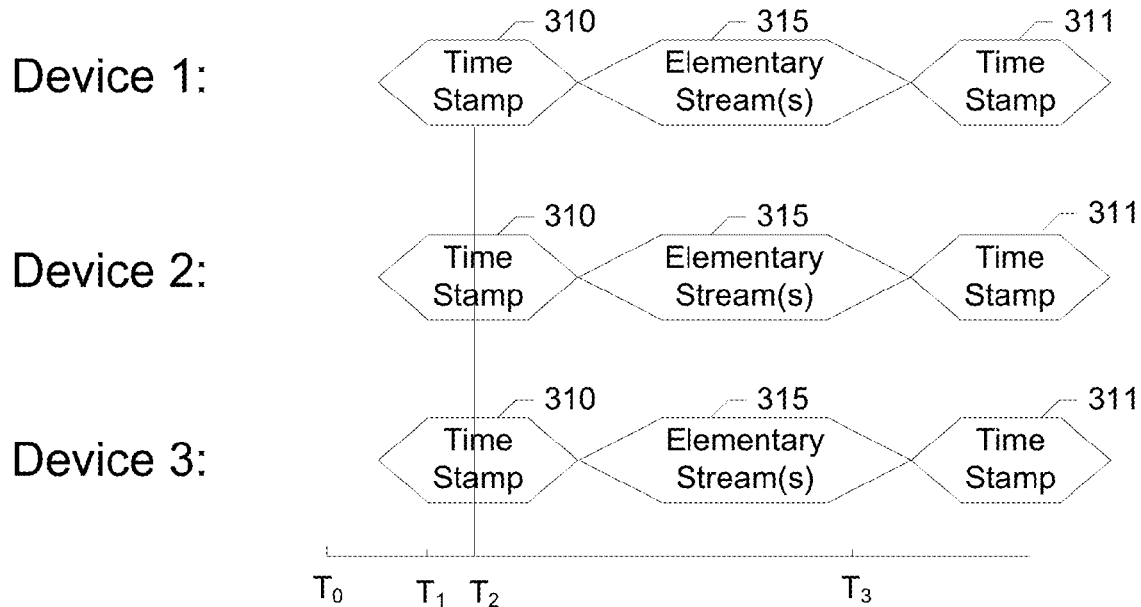
FIG. 3b illustrates example timing according to which the program may be output from several devices.

FIG. 3b illustrates an example of timing according to which the program may be output (e.g. for presentation on an associated display device) from three devices. In FIG. 3b, all three devices output time stamp 310 at time $T_2$. This is an instantaneous or nearly-instantaneous transmission for device 3, which also received time stamp 310 at time $T_2$. Another way to view device 3's delay is that device 3 delays transmission of the program by $T_2-T_2$, which equals zero. Device 2 delays transmission of the program by $T_2-T_0$. Device 1 delays transmission of the program by $T_2-T_1$.

An additional delay may be built into the simultaneous output of the program from devices 1-3. For example, time stamp 310 may be output from each device at time $T_3$ (or any other time). The delay for each device would be the same as the delays discussed above with reference to FIG. 3b, but increased by $T_3-T_2$.

Figure 3C:
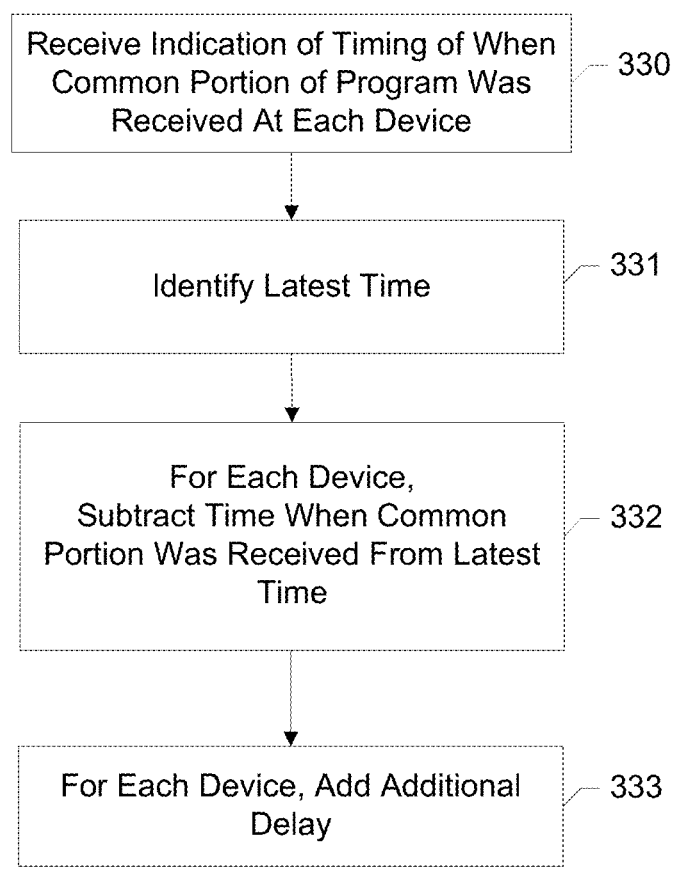
FIG. 3c illustrates an example method of calculating an amount of delay to synchronize a program across devices.

FIG. 3c illustrates a method of calculating the amount of delay required to synchronize a program across devices by using information indicating when a common portion of the program was received or otherwise processed at the devices. The method described with reference to FIG. 3c may also be viewed as a method of calculating the amount of delay required to align or synchronize the synchronization information received from each device.

In step 330, the device that will perform the calculation receives an indication of timing, e.g., the times when a common portion of the program was received, from each device. In the example of FIG. 3a, the common portion of the program was time stamp 310. Other common portions may also be used, such as time stamp 311. The common portion need not be a time stamp, and can instead be a marker or a segment of the show, a predefined image from the show, an audio sound, etc. A common portion may be identified by any suitable identifier, such as a frame number. In the example of FIG. 3a, the times when the common portion of the program was received were time $T_1$ for device 1, time $T_0$ for device 2, and time $T_2$ for device 3. These times may be explicitly indicated in the received information. Alternatively, each device may calculate, if needed, and send a notification when it receives the common portion of the program. The device that receives the notification may identify times $T_0$, $T_1$, and $T_2$ based on when the notifications are received. Corrections for any delay between when the notifications were sent and received may be applied, if needed. Such corrections may be made using techniques such as those used by network time protocol (NTP).

In step 331, the latest time when a common portion of a program was received is identified. In the example of FIG. 3a, this is time $T_2$, which is later than times $T_0$ and $T_1$.

In step 332, a minimum delay is calculated for each device by subtracting the time when the common portion of the program was received at the device from the latest time. In the example of FIG. 3a, this is $T_2-T_1$ for device 1, $T_2-T_0$ for device 2, and $T_2-T_2$ for device 3.

In step 333 an additional delay beyond the minimum delay is added to the time calculated in step 332. An additional delay is not required but may be used for the reasons discussed below. One alternative way of adding additional delay is to add the additional delay to the latest time identified in step 331 prior to performing step 332. One example of a reason to include an additional delay is to allow for variations in program delivery time. Even if a device begins receiving the program at a later time than it initially received the program, the device can still output the program in unison with the other devices by reducing the additional delay. Another example of a reason to include an additional delay is to allow additional devices to synchronize their output without interrupting the already-synchronized devices. For example, after devices 1-3 have synchronized their outputs, a fourth device may need to synchronize with the first three devices. The fourth device may receive time stamp 310 at a time after time $T_2$. The fourth device may synchronize its output with the first three devices so long as the time the fourth device receives time stamp 310 does not exceed time $T_2$, plus the additional delay.

The amount of delay required to synchronize a program across devices may be calculated without utilizing prior knowledge of which portions of a program are common to one another, and without prior definitions of portions at all.

This may be done by taking a fingerprint from the program as it is received at each device, and using the fingerprints to calculate the amount of delay required to synchronize a program across the devices. For example, as will be explained below, a sound bite (e.g., 10 seconds) can be recorded and used as a defined common portion, and the device determining offsets may look for when this same sound bite was displayed at the other devices to determine a time offset.

Figure 4A:
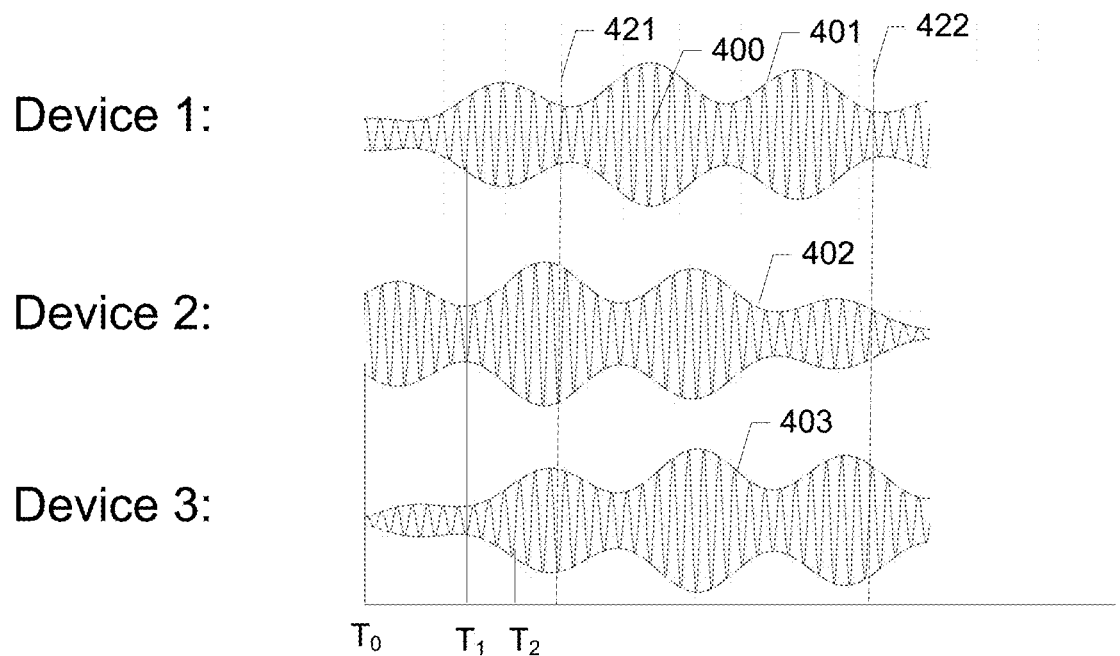
FIG. 4a illustrates timing with which several fingerprints may be received by a device or transmitted to a device.

FIG. 4a illustrates three audio fingerprints 401, 402, and 403. These fingerprints correspond to the program as received by devices 1, 2, and 3, respectively. The devices may transmit the fingerprints to one another or to another location, or otherwise share the information, to facilitate calculating delays required to synchronize a program across the devices.

In the example of FIG. 4a, the audio signal from a program is illustrated by sound wave 400. The fingerprint in this example is the amplitude of the sound wave, as measured at several points in time. This is only one example of a fingerprint, which may be any characteristic extracted from a program that can be used to synchronize presentation of the program. Although FIG. 4a illustrates the sound wave within the lines illustrating the amplitude of the sound wave for clarity, transmission of any information in addition to the fingerprint is optional.

Any type of fingerprint may be used, and it may be digital or an analog. An analog sound wave itself, instead of its amplitude, may be used. The frequency of a sound wave, as measured at several points in time, is another example of a fingerprint. Additional examples include information about a video frame, such as its hue, contrast, brightness, or any other such information.

Corresponding portions of fingerprints 401-403 have been identified in FIG. 4a for clarity. The portion of the fingerprint received by (or from) device 2 at time $T_0$ represents the same portion of program audio as the portion of the fingerprint received by (or from) device 1 at time $T_1$. The portion of the fingerprint received by (or from) device 3 at time $T_2$ also represents the same portion of program audio. Although the above three fingerprints represent the same portion of program audio, the fingerprints may not be identical due to, for example, sampling error or noise in the signal received by one or more of the devices.

Figure 4B:
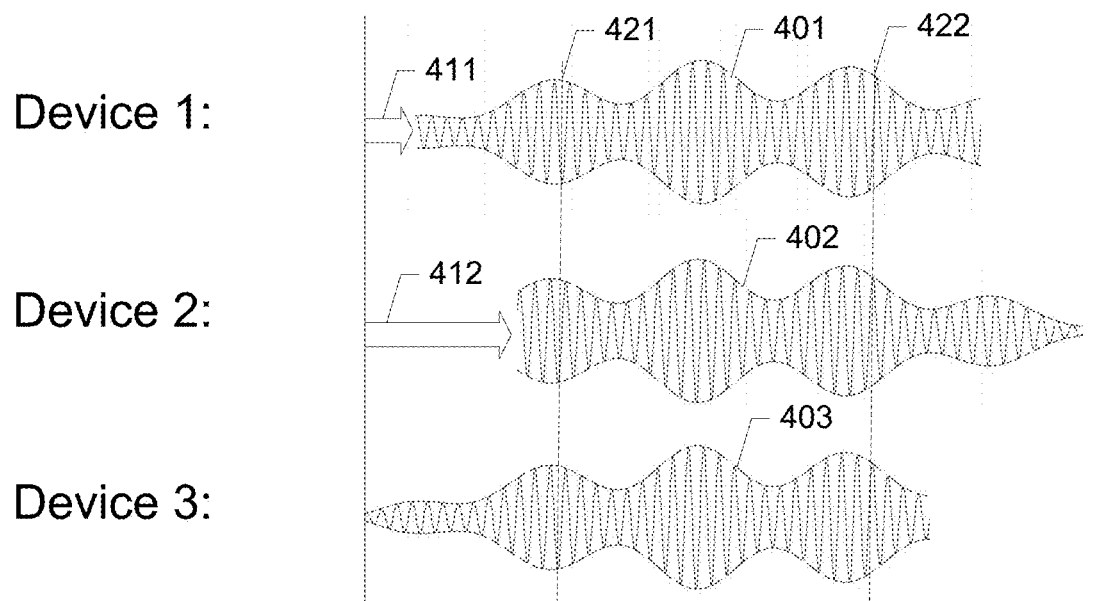
FIG. 4b illustrates how fingerprints may shifted so that corresponding portions of the fingerprints are aligned in time.

FIG. 4b illustrates fingerprints 401, 402, and 403 shifted in time so that corresponding portions of the fingerprints are aligned in time. The shift in time between FIG. 4a and FIG. 4B is illustrated by arrows 411 and 412. Output of the program from devices 1, 2, and 3 may be synchronized by delaying the program by the magnitude of these shifts. For example, shift 411 indicates the amount by which device 1 may delay the program, and shift 412 indicates the amount by which device 2 may delay the program in order to synchronize output of the program from device 1, 2, and 3.

Figure 4C:
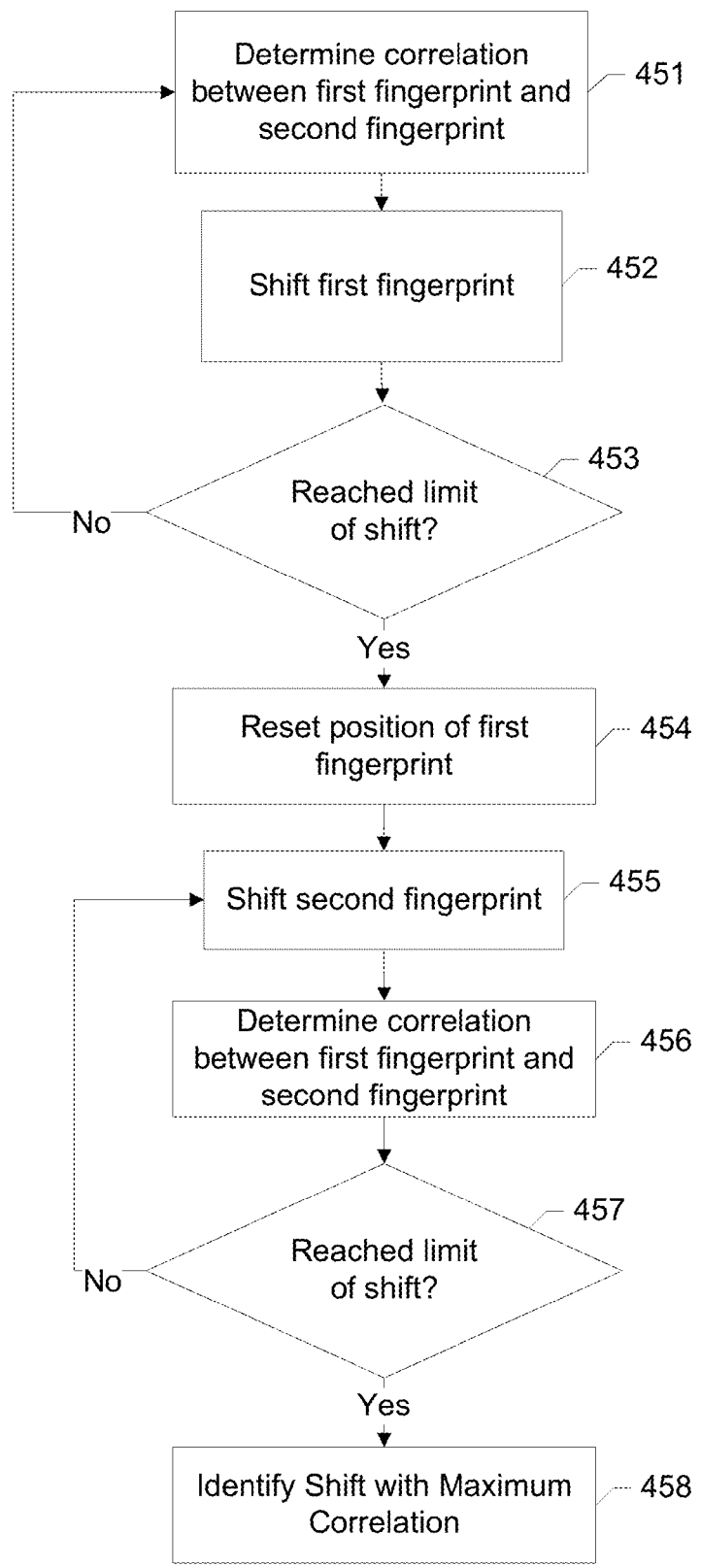
FIG. 4c illustrates a method for calculating an amount of time by which to shift a fingerprint in order to align it with another fingerprint.

FIG. 4c illustrates a method for calculating the amount of time by which to shift a fingerprint in order to align it with another fingerprint. In general terms, the two received fingerprint patterns may be shifted in time with respect to one another to find the shift that results in the best match or most similarity. In step 451, the degree of correlation between a first fingerprint and a second fingerprint is calculated or otherwise determined. The correlation may be calculated over a limited time horizon. The degree of correlation may be, for example, the correlation coefficient between the amplitude values of each fingerprint. An example of a time horizon over which the correlation may be calculated is illustrated by beginning and ending times 421 and 422 in FIGS. 4a and 4b. A limited time horizon may be useful to reduce the complexity of the calculations and also to avoid calculating correlations between times when a data for one or more of the fingerprints may not be present.

Figure 4D:
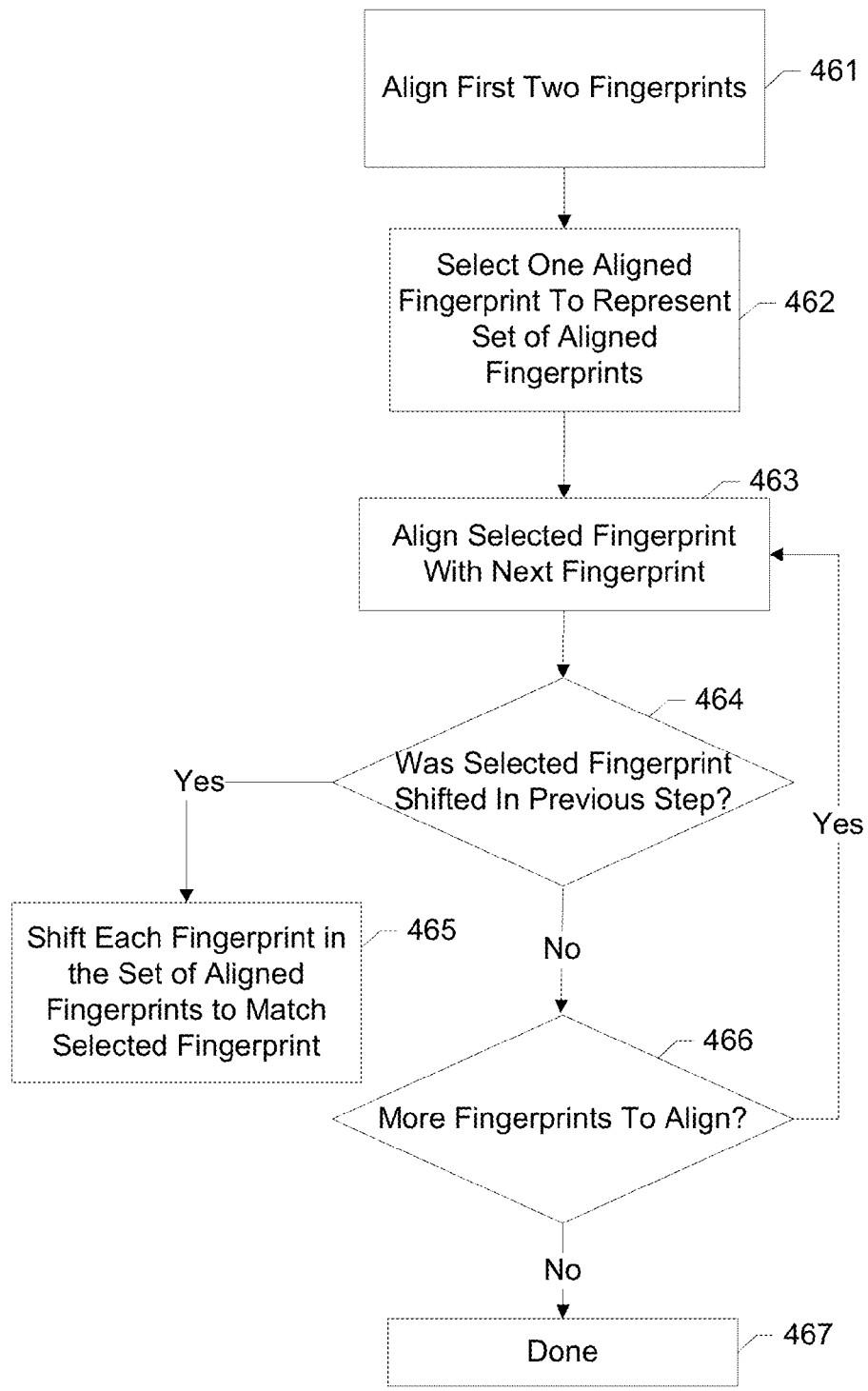
FIG. 4d illustrates a method for aligning multiple fingerprints with one another.
Figure 4E:
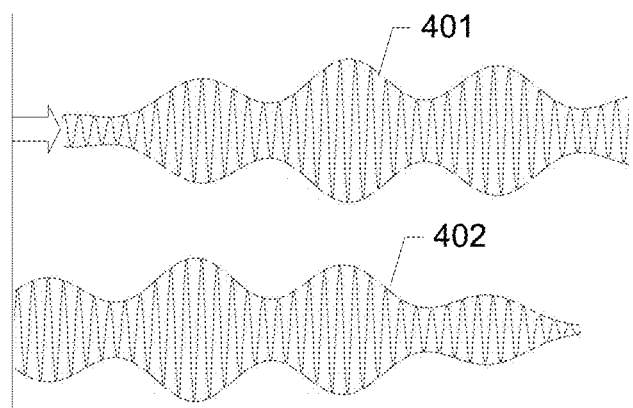
FIGS. 4e-4h illustrate examples of how fingerprints may be shifted relative to one another.
Figure 4F:
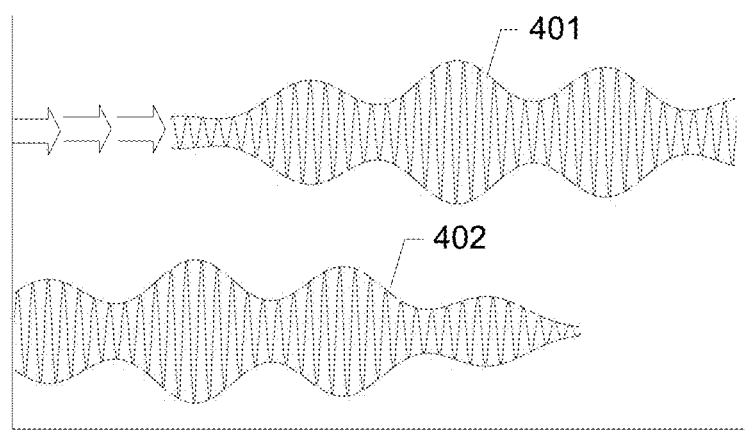

In step 452, the first of the two fingerprints being compared is shifted. For example, as illustrated in FIG. 4e, fingerprint 401 may be shifted forward. The shift may be, for example, 200 milliseconds. In some embodiments, the amount of the shift and/or the direction of the shift may vary depending on the magnitude of previously calculated correlations or the trend in previously calculated correlations. For example, low correlations or correlations that are trending downward may result in larger shifts between calculations, whereas higher correlations or correlations that are trending upward may result in smaller shifts between correlations. Adjusting the amount of the shift in this manner may reduce the total number of calculations required to find the shift for which the correlation is highest.

Figure 4G:
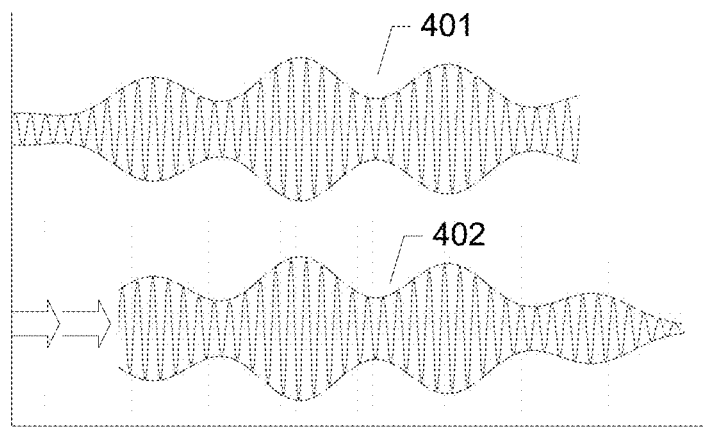

In step 453 it is determined if a limit on the amount by which a fingerprint will be shifted has been reached. For example, FIG. 4f may illustrate the limit on the amount by which fingerprint 401 will be shifted. The limit may be, for example, the maximum expected amount of difference between when the program will reach two different devices. The limit may also be, for example, the maximum amount by which a fingerprint can be shifted without being shifted past the time horizon over which the correlation is calculated. (An example of such a time horizon is illustrated by beginning and ending times 421 and 422 in FIGS. 4a and 4b.) The limit may also be an arbitrary amount or an amount that adjusts over time, as will be explained in more detail below. If the limit has not been reached, then processing returns to step 451. If it has been reached, then the position of the first fingerprint is reset (i.e. any previous shifts to the first fingerprint are undone) in step 454 and the second fingerprint is now shifted in step 455. For example, fingerprint 401 is returned to its original position, as illustrated in FIG. 4g, and fingerprint 402 will be shifted instead.

In step 456, the degree of correlation between the first fingerprint and the second fingerprint is calculated or otherwise determined, e.g., as it was in step 451, above. In step 457 it is determined if a limit on the amount by which a fingerprint will be shifted has been reached. If the limit has not been reached, then processing returns to step 455. If it has been reached, then the correlations that were calculated in steps 451 and 456 are searched and the highest correlation is identified. The fingerprint being shifted and the amount of the shift associated with that correlation are identified in step 458. The identified shift represents the amount of delay that will best align the fingerprints and therefore the programs used to generate the fingerprints. FIG. 4g illustrates an example of the shift identified in step 458.

Figure 4H:
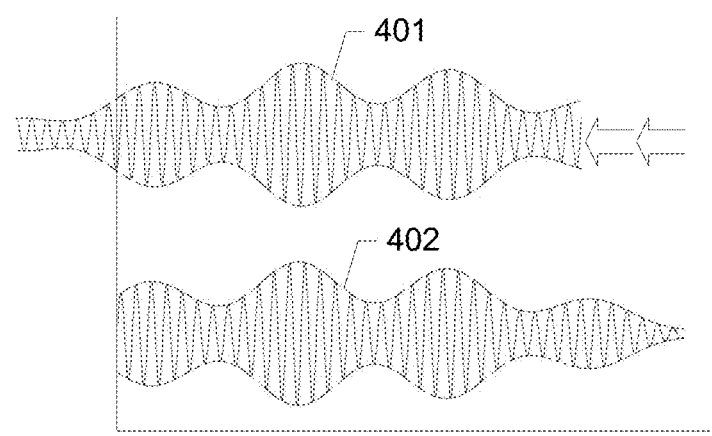

Several variations on the method described with reference to FIG. 4c are possible. For example, only one fingerprint may be shifted. The shift of the fingerprint may range from a maximum negative amount to a maximum positive amount. The negative amounts would represent a positive shift of the other fingerprint. An example of a negative shift is shown in FIG. 4h.

Another variation of the methods described above is dynamically adjusting the limit of the shift. For example, the correlations for a narrow range, such as shifts of up to 400 ms, may be determined. If one of those correlations is high, then the method may end, but if the calculated correlations are not sufficiently high, then the steps illustrated in FIG. 4c may be repeated using a wider range of shifts, such as shifts of up to 800 ms or more. Similarly, the process may end immediately if a sufficiently high correlation is identified. A sufficiently high correlation may be, for example, a correlation coefficient of 0.98 or above. In addition to the methods and variations mentioned above, any suitable pattern matching technique may be used.

The FIG. 4c method may result in aligning two fingerprints. FIG. 4d illustrates a method for expanding this to align additional fingerprints, such as a third, fourth, fifth, etc. fingerprint. First, in step 461, the first two fingerprints are aligned with each other by shifting one of the two fingerprints. This may be performed using, for example, the method described above with reference to FIG. 4c.

In step 462, one of the first two fingerprints is selected for use in further comparisons with a third (or the next) fingerprint. The selected fingerprint and the next (unaligned) fingerprint are then aligned in step 463. The method described above with reference to FIG. 4c may be used to perform step 463. Other methods of pattern matching may be used as well.

If the fingerprint selected in step 462 was shifted as a result of the alignment in step 463, then, in step 465, each or a set of the fingerprints that were previously aligned with the fingerprint selected in step 462 are shifted by the same amount. This helps ensure that all of the previously-aligned fingerprints remain in alignment.

If there are more fingerprints to align (such as a fourth fingerprint), steps 463-465 may be repeated until all of the fingerprints are aligned (step 466).

Instead of selecting a single fingerprint in step 462, a composite of the one or more aligned fingerprints may be produced and used for the comparison in step 463. For example, the amplitude measurements of each of the aligned fingerprints may be averaged to create a composite fingerprint. Similarly, the alignment of step 463 may be calculated with reference to some or all of the already-aligned fingerprints instead of just a selected one. For example, several correlation coefficients may be calculated for each shift amount—one for each of the already-aligned fingerprints. The best alignment with all of the previously-aligned fingerprints may be identified in step 463. For example, the shift for which the average of the several correlation coefficients is highest may be identified in step 463.

In some embodiments, a device may be able to influence or control the timing with which a program is delivered or the timing with which a program is transmitted from another device. For example, the program may be delivered from storage media, such as the media in a digital video recorder, or from an on-demand source, such a video on demand server. In these embodiments a device may continue to synchronize its output with other devices by buffering the received program and outputting the received program from the buffer after the appropriate amount of time. However, a device may also alter the timing with which the program is delivered to the device by altering the timing of its requests for the content. Both of these techniques, and others described herein, may be used together. For example, a target amount of buffered data may be maintained, and the timing of requests for content may be altered in order to maintain that target amount. The magnitude of the alteration to the timing with which a program is requested may be calculated using the same techniques discussed above with reference to calculating the magnitude of delay in outputting the program.

Figure 5:
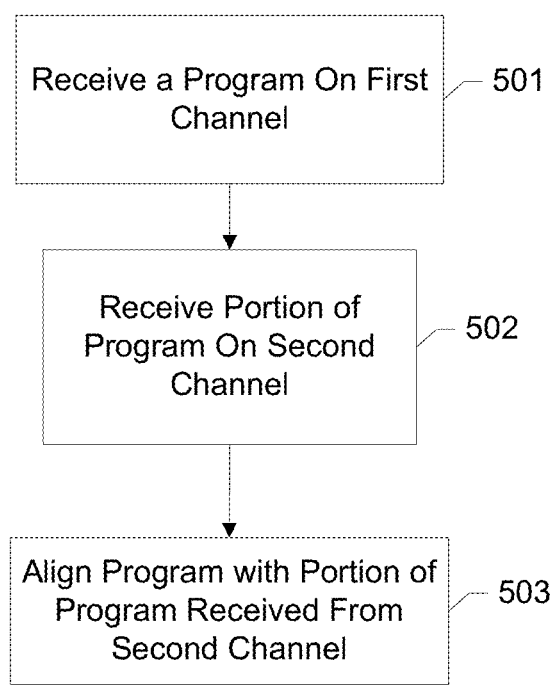
FIG. 5 illustrates another example of how a device may align output a program with another device.

FIG. 5 illustrates another example of how a device may output a program such that the presentation of the output is synchronized with another device. In step 501, a program is received on a first channel (e.g. a communication path, a frequency range, a signal, a logical or physical connection, etc.). Using the example of FIG. 1, the program may be received via one of links 187-194.

In step 502, a portion of the program is received on a second channel. Using the example of FIG. 1, the portion of the program may be received via link 195. The program may be, for example, a movie; and the portion of the program received via link 502 may be the audio of the movie. The portion of the program received in step 502 may be comingled with other data. For example, audio received in step 502 may include not only the audio feed of the movie, but also the microphone feed of a member of a collaborative chat.

The device performing the method of FIG. 5 may also transmit the audio feed received from the first channel to another device on the second channel. Additional data, such as a microphone feed from the device performing the method of FIG. 5, may also be transmitted on the second channel. In this example, the device performing the method of FIG. 5 may transmit on the second channel both the audio feed of a movie (as received, for example, on the first channel) as well as the microphone feed from a user of the device performing the method of FIG. 5.

In step 503, the device aligns its output of the program with the portion of the program received from the second channel. For example, the device may delay its output of the video of a movie in order to align the video with the audio received on the second channel. The device may output the aligned video and the audio received on the second channel. The audio received on the second channel may replace the audio received on the first channel. The alignment of the video and the audio received on the second channel may be achieved, for example, by examining time references embedded in the video and audio feeds and aligning the time references. A technique similar to the technique described above with reference to FIGS. 3a-c may be used.

Another benefit of the method of FIG. 5 is that it may help to reduce audio echoes. Echoes may occur due to the audio output of a program being picked up by a first user's microphone. The copy of the program's audio output that is picked up by the microphone may be transmitted to a second user. The second user would then hear both the original audio output of the program and also the copy of the program's audio output transmitted from the first user. That two copies of the same audio are being output may be unnoticeable if the delay between when each copy is output is small enough. However, if the copies of the program's audio are output with enough delay (for example, more than 100 ms), then the second user may perceive this delay as an echo.

Echoes may be minimized using a variety of techniques. For example, directional microphones may be used to minimize retransmission of the program's audio. The method described above may help to reduce or eliminate echoes by keeping multiple copies of the program's audio from being output. For example, the device performing the method of FIG. 5 may not output the program's original audio feed as received on the first channel. Instead, the device performing the method of FIG. 5 outputs only the program's audio feed as received on the second channel. Because the audio feed received on the first channel is not output, a delay between this audio feed and the audio feed received on the second channel does not cause an echo. The audio received on the second channel may include both the audio of the program and the contents of a voice chat.

Figure 6:
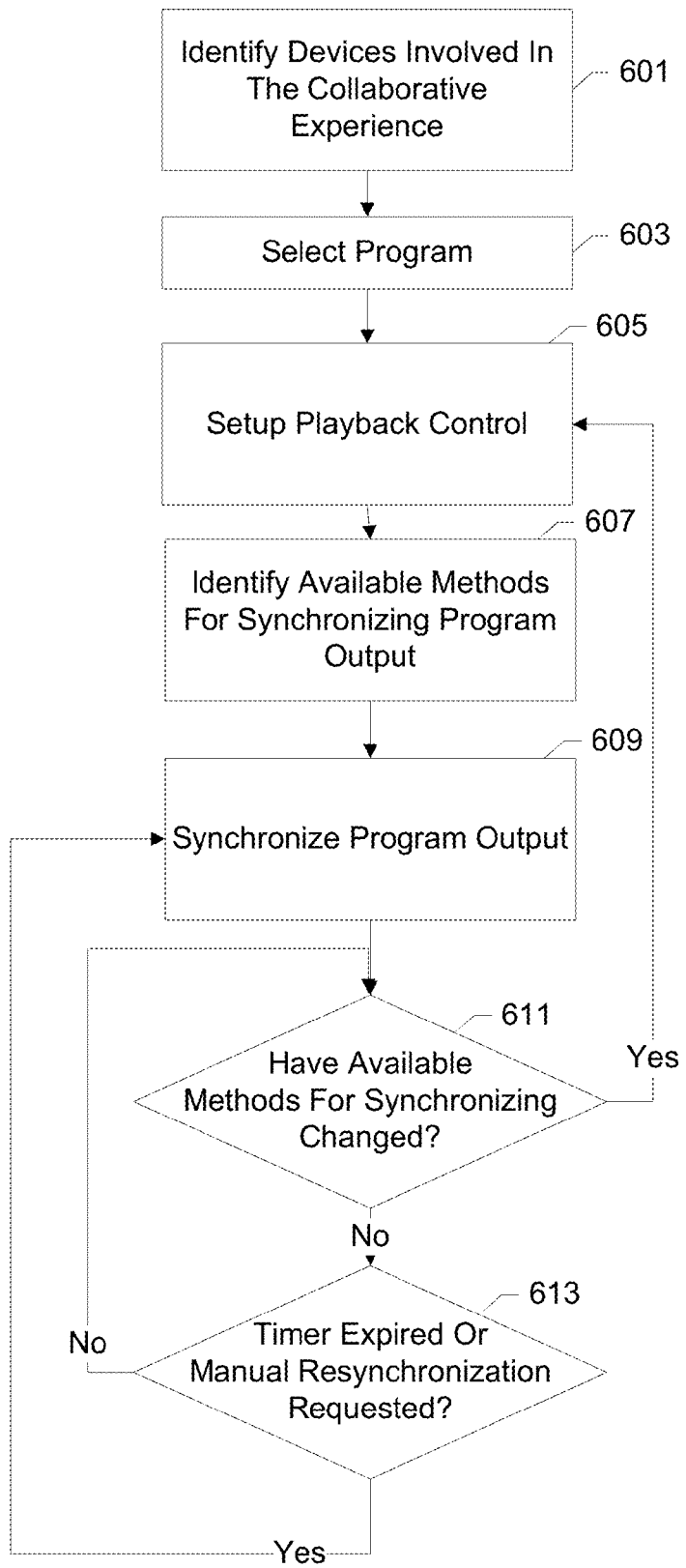
FIG. 6 illustrates a method for synchronization during a collaborative experience of a program.

FIG. 6 illustrates a method for initializing and maintaining program synchronization during a collaborative experience, e.g., multiple devices and/or users consuming the program at the same time. In step 601, a group of devices involved in the collaborative experience are identified. By identifying the devices involved, communication between the devices over a two-way communications channel is enabled, or a previously existing communication path, e.g., one provided by a service provider, may be identified and used. This may be performed in a variety of ways. For example, a user who wishes to collaboratively experience a program may input or select IP addresses, domain names, user names, phone numbers, or any other identifier related to the group of other users with which the program will be experienced. After one user inputs such information, other users may receive an invitation to join the group. The identifiers entered or selected by a user may be resolved to network addresses that each user's device can use to send messages directly to one another. Each device may also connect to one or more servers or other computing devices. The servers (or other computing devices) may inform each member of the group of network address or other identifiers needed to facilitate direct communication between the member of the group. Alternatively, each device may communicate with the server (or other computing device), and the server (or other computing device) may act as an intermediary for some or all of the communications between the devices involved in the collaborative experience.

Once the devices involved in the collaborative experience are identified in step 601, the program that is to be collaboratively experienced is selected in step 603. Step 603 may be performed prior to or concurrently with step 601. For example, an invitation to a collaborative viewing experience may specify the program that is to be viewed. Alternatively, users may choose a program collaboratively by, for example, nominating one or more programs and voting on the programs.

Playback control may be specified in a similar manner in step 605. For example, the users collaboratively experiencing a program may nominate one user to control when the program is rewound, fast-forwarded, paused, etc. Alternatively, each user may retain control over the presentation of the program. For example, any one user pausing the program may cause the program to be paused for the other users in the collaborative experience. Alternatively, a certain number of the users (such as 50% of the users or all of the users) may have to press pause before playback will pause. An indication of the number of users that wish to pause the program may be displayed on each user's screen. Each user's vote to pause the program may expire after a set amount of time, such as, for example 5 seconds. The amount of time after which a vote to pause the program expires may be a function of the number of users in the collaborative experience. For example, the time period after which votes to pause expire may be 4 seconds, multiplied by the number of users that are collaboratively experiencing the program. The control schemes above may apply not just to pausing the program, but also to rewinding (including instant replays), fast-forwarding, or other ways of controlling the program.

Another example of a playback control scheme is that some actions, such as rewinding or fast-forwarding, will cause a user's device to lose synchronization with the other devices. For example, a user may choose to re-watch a section of the program without affecting the playback of the program for the other users. A user may be able to return playback to the schedule being used by the other devices by entering a command. Rules for when one user's actions may affect playback of the program on another device may be selected by each user individually, or the rules may be selected as a group. In some systems, these rules may be specified by default.

Each device may identify the available methods for synchronizing output of the program in step 607. For example, each device may indicate whether or not the copy of the program being received includes presentation time stamps or other time stamps. If the copy of the program received by all of the devices includes compatible time stamps, then the output of the program may be synchronized using, for example, the method described above with reference to FIGS. 3*a*-*c*. However, if one or more of the devices does not include a compatible time stamp, then another synchronization method may be used, such as the method described above with reference to FIGS. 4*a*-*h*. The devices may compare the types of fingerprints that each device is capable of providing and select one or more types of fingerprints that are compatible with all of devices. Similarly, the devices may determine whether to calculate delay amounts individually, to have one device of the group calculate delay amounts for all of the devices in the group, or to rely on a server or other external computing device to calculate the delay amounts. These options may be determined based on the capabilities of each device. For example, a relatively low-powered devices that may not have processing power to calculate delay amounts may request that the calculations be performed on another device, such as a server. Each device may calculate delay amounts individually absent such a request. Where it is needed for the selected synchronization algorithm, the devices may synchronize their clocks using, for example, network time protocol.

The synchronization method negotiated in step 607 is performed in step 609. In step 611, it is determined if the available methods for synchronization have changed. For example, a new device may have joined the collaborative experience, or the content of the program received by a device may have changed. Another example is that a user stopped using one device and began using another device to collaboratively experience the content. Under any of these scenarios, steps 605-609 may be repeated to ensure synchronization between the users.

In step 613, the synchronization step (609) may be repeated if a manual resynchronization request is received or a timer expires. A manual resynchronization request may occur because, for example, a user believes the program is not being presented simultaneously to all of the users in the group. A timer may expire where resynchronization is configured to occur periodically. Where a timer is used to cause periodic resynchronization, the length of time between resynchronizations may be adjusted depending on, for example, the capabilities of the devices in the group, the frequency with which manual resynchronizations have been requested, a rate with which transmission errors have been detected, or any other factor.

In some embodiments, resynchronizations will not interfere with a user's experience once it has started. For example, the resynchronization process may determine that one device is presenting the program 500 ms before another device. This difference in output times may be ignored so long as the difference is under a certain threshold. Where an immediate adjustment to a device's output delay is not made, an adjustment may be made at an inconspicuous time. For example, the 500 ms adjustment may be made when a user pauses, rewinds, or fast-forwards the program. Differences over a certain threshold may cause an immediately adjustment in a device's output delay.

Resynchronization may also occur when certain events occur in a program. For example, a resynchronization may occur after commercial breaks. Commercial breaks may be identified, for example, by audio queue tones or metadata packaged with the program, including, for example, time stamps included with the program. Resynchronizing after commercial breaks may be advantageous because each user in the collaborative experience may be presented with different commercials. The different commercials may result in the programming being received by the devices in the group with different delays after the commercials are over.

Resynchronization may also occur, for example, if a user changes the channel or otherwise selects a different program than the first program that was experienced collaboratively. The devices may store a separate delay amount for each program. This may allow for group "channel surfing" without needing to resynchronize each time the channel is changed.

Figure 7:
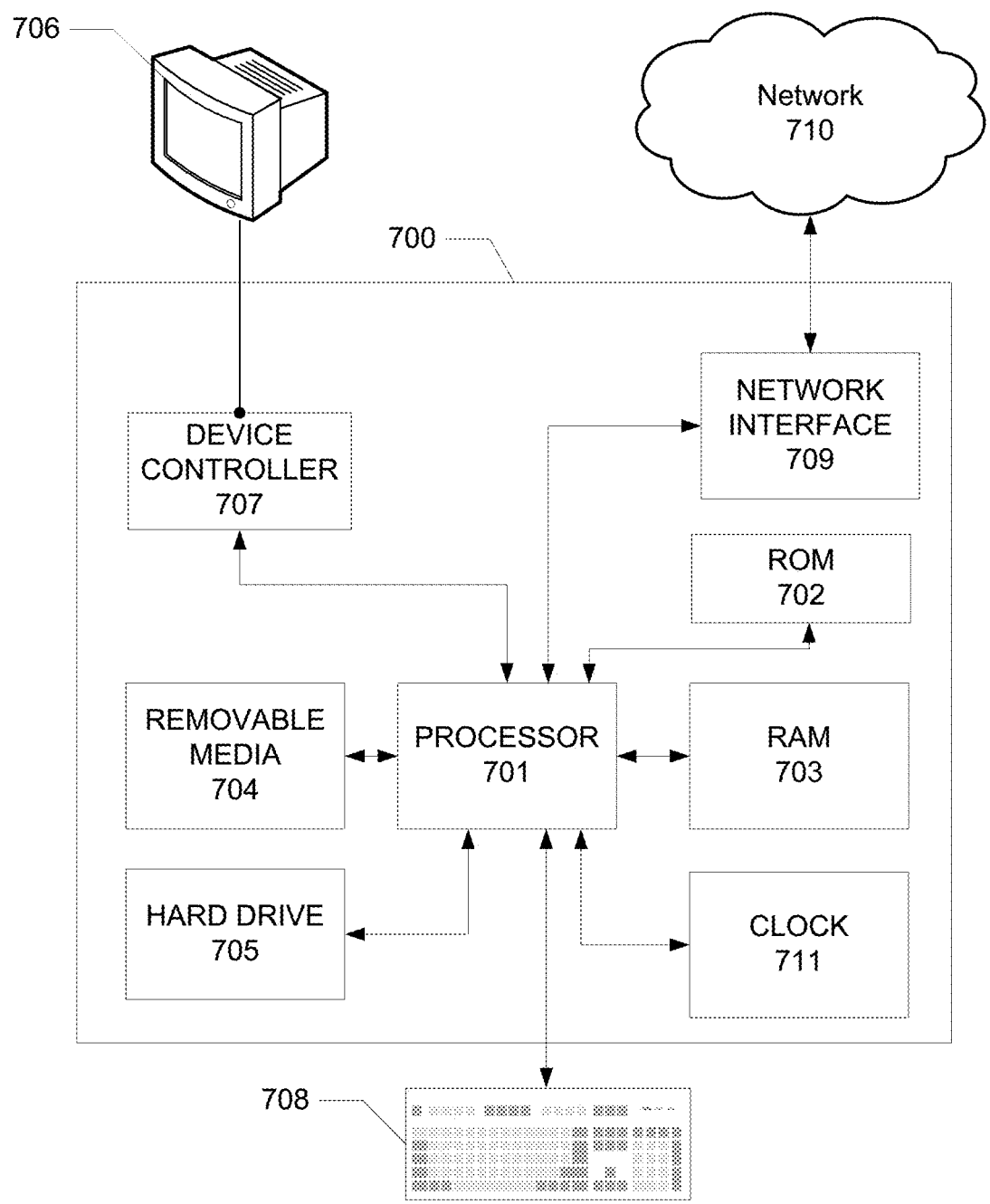
FIG. 7 illustrates an example computing device having hardware and software on which various methods and devices of the disclosure may be implemented.

FIG. 7 illustrates an example of general hardware and software structures that may be used to implement any of the various computing elements discussed above, such as any of devices 140-154. The computing element 700 may include one or more processors 701, which may execute instructions of a computer program to perform any of the features described herein. The instructions may be stored in any type of computer-readable medium or memory, to configure the operation of the processor 701. For example, instructions may be stored in a read-only memory (ROM) 702, random access memory (RAM) 703, removable media 704, such as a Universal Serial Bus (USB) drive, compact disk (CD) or digital versatile disk (DVD), floppy disk drive, or any other desired electronic storage medium. Instructions may also be stored in an attached (or internal) hard drive 705. The computing element 700 may include one or more output devices, such as a display 706 (or an external television), and may include one or more output device controllers 707, such as a video processor. There may also be one or more user input devices 708, such as a remote control, keyboard, mouse, touch screen, microphone, etc. The computing element 700 may also include one or more network interfaces, such as input/output circuits 709 (such as a network card) to communicate with an external network 710. The network interface may be a wired interface, wireless interface, or a combination of the two. In some embodiments, the interface 709 may include a modem (e.g., a cable modem). Network 710 may include communication lines such as optical cables, coaxial cables, Ethernet cables, satellite or other wireless links (including cellular links), etc. Computing element 700 may connect to a plurality of networks simultaneously. Network Interfaces 709 may have dedicated hardware for each network, or some or all of the hardware may serve multiple networks simultaneously. The computing element 700 may also include one or more clocks 711. A clock may interface with processor 701, network 710, and/or other communications devices to ensure that it is set accurately, as was discussed above.

One or more aspects of the disclosure may be embodied in computer-usable or readable data and/or executable instructions, such as in one or more program modules, executed by one or more processors or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium, as described above. As will be appreciated by one of skill in the art, the functionality of the program modules may be combined or distributed as desired in various illustrative embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of executable instructions and computer-usable data described herein.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps described above may be performed in other than the recited order, including concurrently, and that one or more steps may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
   receiving, by a first device and via a first communications channel, content;
   determining, by the first device, a first audio fingerprint based on the content;
   receiving, by the first device and from a second device via a second communications
   channel that is different from the first communications channel, a second audio fingerprint; in response to a determination that the first audio fingerprint and the second audio fingerprint are unaligned, adjusting at least one of the first audio fingerprint or the second audio fingerprint relative to the other;
   in response to the adjusting, determining that the first audio fingerprint and the second audio fingerprint are aligned satisfying a threshold;
   in response to the determining that the first audio fingerprint and the second audio fingerprint are aligned, determining, by the first device and based on an amount of the adjusting, delay information; and
   transmitting, by the first device and to the second device via the second communications channel, the delay information to cause synchronization of a first output of the content by the first device with a second output of the content by the second device.

2. The method of claim 1, wherein the delay information indicates a length of time by which the second device is to delay the second output of the content.

3. The method of claim 2, wherein the length of time is determined based on the amount of the adjusting and a variation in delivery times of the content to the first device and the second device.

4. The method of claim 1, wherein the determination that the first audio fingerprint and the second audio fingerprint are unaligned is responsive to a determination of an occurrence of a commercial break within the content.

5. The method of claim 1, wherein the determination that the first audio fingerprint and the second audio fingerprint are unaligned is responsive to a channel change operation.

6. The method of claim 1, further comprising:
in response to a determination that there is a difference in time between the first output of the content by the first device and the second output of the content by the second device, causing resynchronization of the first output of the content by the first device with the second output of the content by the second device.

7. The method of claim 1, wherein the determination that the first audio fingerprint and the second audio fingerprint are unaligned is responsive to a determination of an occurrence of a pause, rewind, or fast-forward operation.

8. The method of claim 1, further comprising:
prior to the receiving the content, selecting, based on one or more votes, the content.

9. The method of claim 1, further comprising:
rewinding, fast-forwarding, or pausing, based on an input from a person associated with the second device, the first output of the content by the first device.

10. The method of claim 1, further comprising:
pausing, rewinding, or fast-forwarding, based on a determination that a number of users who have selected a pause, rewind, or fast-forward option satisfies a second threshold, the first output of the content by the first device.

11. The method of claim 1, further comprising:
pausing, based on a determination that a number of unexpired votes for pausing satisfies a second threshold, the first output of the content by the first device, wherein each of the unexpired votes is set to expire after an amount of time that is based on a number of users participating in a synchronized viewing of the content.

12. A method comprising:
receiving, by a first device and via a first communications channel, a media program comprising first video data and first audio data;
determining, by the first device, a first fingerprint based on the first audio data;
receiving, by the first device and from a second device via a second communications channel that is different from the first communications channel, a second fingerprint representing second audio data;
in response to a determination that the first fingerprint and the second fingerprint are unaligned, adjusting at least one of the first fingerprint or the second fingerprint relative to the other;
after the adjusting, determining that the first fingerprint and the second fingerprint are aligned satisfying a threshold;
in response to the determining that the first fingerprint and the second fingerprint are aligned, determining, based on an amount of the adjusting, delay information; and
transmitting, by the first device and to the second device via the second communications channel, the delay information to cause synchronization of a first output of the first audio data by the first device with a second output of the second audio data by the second device.

13. The method of claim 12, further comprising:
determining, based on data within the media program, an occurrence of a commercial break,
wherein the determination that the first fingerprint and the second fingerprint are unaligned is responsive to the determining the occurrence of the commercial break.

14. The method of claim 12, further comprising: determining, based on audio tones within the media program, an occurrence of a commercial break,
wherein the determination that the first fingerprint and the second fingerprint are unaligned is responsive to determining the occurrence of the commercial break.

15. The method of claim 12, wherein the determining the delay information comprises:
determining a difference in time between matching portions of the first fingerprint and the second fingerprint; and
adding additional time to the difference to obtain the delay information.

16. The method of claim 12, wherein the determining the first fingerprint comprises determining a frequency at one or more points in the first audio data.

17. A method comprising:
receiving, by a first device and via a first communications channel, first content;
determining, by the first device, a first audio fingerprint based on audio data of the first content;
receiving, by the first device and from a second device via a second communications channel that is different from the first communications channel, a second audio fingerprint;
in response to a determination that the first audio fingerprint and the second audio fingerprint are unaligned, adjusting at least one of the first audio fingerprint or the second audio fingerprint relative to the other to align, satisfying a threshold, the first audio fingerprint and the second audio fingerprint;
in response to the adjusting, determining, based on an amount of the adjusting, delay information;
transmitting, by the first device and to the second device via the second communications channel, the delay information; and
outputting, by the first device and based on the delay information, the first content in synchronization with second content output by the second device.

18. The method of claim 17, wherein the determination that the first audio fingerprint and the second audio fingerprint are unaligned is responsive to a determination of an occurrence of a commercial break within the first content.

19. The method of claim 17, wherein the determination that the first audio fingerprint and the second audio fingerprint are unaligned is responsive to a determination of an occurrence of a pause, rewind, or fast-forward operation.

\* \* \* \* \*

UNITED STATES PATENT AND TRADEMARK OFFICE
CERTIFICATE OF CORRECTION

| | |
|---|---|
| PATENT NO. | : 9,854,284 B2 |
| APPLICATION NO. | : 14/948418 |
| DATED | : December 26, 2017 |
| INVENTOR(S) | : Francisco |

It is certified that error appears in the above-identified patent and that said Letters Patent is hereby corrected as shown below:

In the Specification

Column 9, Detailed Description, Line 48:
Delete "4B" and insert --4b-- therefor

Column 12, Detailed Description, Line 8:
Delete "502" and insert --195-- therefor In the Claims Column 16, Claim 1, Line 46:
After "communications", delete "¶"

Column 16, Claim 1, Line 48:
After "fingerprint;", insert --¶--

Column 18, Claim 14, Line 12:
After "comprising:", insert --¶--

Signed and Sealed this
Thirteenth Day of December, 2022

Katherine Kelly Vidal
*Director of the United States Patent and Trademark Office*